(12) United States Patent
Chien et al.

(10) Patent No.: US 10,723,918 B2
(45) Date of Patent: Jul. 28, 2020

(54) PRIMER COMPOSITIONS FOR OPTICAL FILMS

(71) Applicant: 3M INNOVATIVE PROPERTIES COMPANY, St. Paul, MN (US)

(72) Inventors: Bert T. Chien, St. Paul, MN (US); Christopher P. Gerlach, Woodbury, MN (US); Gregory F. King, Minneapolis, MN (US); Peggy S. Willett, Fort Myers, FL (US); Christopher A. Haak, Pine Springs, MN (US); Ronald K. Thery, New Brighton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 102 days.

(21) Appl. No.: 15/983,690

(22) Filed: May 18, 2018

(65) Prior Publication Data
US 2018/0265740 A1 Sep. 20, 2018

Related U.S. Application Data

(63) Continuation of application No. 14/375,146, filed as application No. PCT/US2013/023367 on Jan. 28, 2013, now abandoned.

(60) Provisional application No. 61/594,405, filed on Feb. 3, 2012.

(51) Int. Cl.
| | |
|---|---|
| B32B 7/12 | (2006.01) |
| C09J 7/25 | (2018.01) |
| B32B 17/10 | (2006.01) |
| G02B 1/04 | (2006.01) |
| C09J 7/50 | (2018.01) |
| C08G 18/48 | (2006.01) |
| C08G 18/12 | (2006.01) |
| C08G 18/08 | (2006.01) |
| C08G 18/10 | (2006.01) |
| C08G 18/75 | (2006.01) |
| C08G 18/66 | (2006.01) |
| C08G 18/34 | (2006.01) |
| C09D 175/08 | (2006.01) |
| B32B 17/06 | (2006.01) |
| B32B 33/00 | (2006.01) |

(52) U.S. Cl.
CPC .............. *C09J 7/255* (2018.01); *B32B 7/12* (2013.01); *B32B 17/064* (2013.01); *B32B 17/10* (2013.01); *B32B 17/10036* (2013.01); *B32B 17/10688* (2013.01); *B32B 17/10761* (2013.01); *B32B 17/10779* (2013.01); *B32B 33/00* (2013.01); *C08G 18/0823* (2013.01); *C08G 18/10* (2013.01); *C08G 18/12* (2013.01); *C08G 18/348* (2013.01); *C08G 18/4808* (2013.01); *C08G 18/4825* (2013.01); *C08G 18/6692* (2013.01); *C08G 18/758* (2013.01); *C09D 175/08* (2013.01); *C09J 7/50* (2018.01); *G02B 1/04* (2013.01); *B32B 2250/02* (2013.01); *B32B 2250/03* (2013.01); *B32B 2250/40* (2013.01); *B32B 2255/10* (2013.01); *B32B 2255/26* (2013.01); *B32B 2315/08* (2013.01); *B32B 2367/00* (2013.01); *B32B 2405/00* (2013.01); *B32B 2419/00* (2013.01); *C09J 2201/606* (2013.01); *C09J 2201/61* (2013.01); *C09J 2467/006* (2013.01); *C09J 2475/003* (2013.01); *C09J 2475/006* (2013.01); *Y10T 428/2826* (2015.01); *Y10T 428/31565* (2015.04)

(58) Field of Classification Search
None
See application file for complete search history.

(56) References Cited

U.S. PATENT DOCUMENTS

| | | | |
|---|---|---|---|
| 2,736,721 | A | 2/1956 | Dexter |
| 3,437,622 | A | 4/1969 | Dahl |
| 3,610,724 | A | 10/1971 | Frizzell |
| 3,708,296 | A | 1/1973 | Schlesinger |
| 3,711,176 | A | 1/1973 | Alfrey |
| 3,718,712 | A | 2/1973 | Tushaus |
| 3,841,890 | A | 10/1974 | Coaker |
| 4,069,055 | A | 1/1978 | Crivello |
| 4,144,217 | A | 3/1979 | Snelgrove |
| 4,216,288 | A | 8/1980 | Crivello |

(Continued)

FOREIGN PATENT DOCUMENTS

| | | |
|---|---|---|
| EP | 1129844 | 9/2001 |
| JP | 2002-187746 | 7/2002 |

(Continued)

OTHER PUBLICATIONS

International Search Report for PCT International Application No. PCT/US2013/023367, dated May 27, 2013, 3 pages.

*Primary Examiner* — Anish P Desai
(74) *Attorney, Agent, or Firm* — Jeffrey M. Olofson

(57) ABSTRACT

Articles and laminates include a substrate with a first polyester surface and a second polyester surface, a crosslinked polyurethane-based primer coated on at least the first polyester surface, and an optically clear heat activated adhesive adjacent to the crosslinked polyurethane-based primer. The articles and laminates are prepared by applying a polyurethane-based dispersion and a crosslinker on at least one polyester surface, drying the applied coating, heating while stretching the substrate and the coating to form a crosslinked primer layer on the stretched polyester surface, and applying an optically clear heat activated adhesive onto the crosslinked primer layer.

15 Claims, No Drawings

(56) References Cited

U.S. PATENT DOCUMENTS

| | | | |
|---|---|---|---|
| 4,250,311 A | 2/1981 | Crivello | |
| 4,262,072 A | 4/1981 | Wendling | |
| 4,446,305 A | 5/1984 | Rogers | |
| 4,540,623 A | 9/1985 | Im | |
| 4,755,337 A | 7/1988 | Takahashi | |
| 4,948,450 A | 8/1990 | Hurter | |
| 4,952,457 A | 8/1990 | Cartier | |
| 4,980,108 A | 12/1990 | Suzuki | |
| 5,051,474 A | 9/1991 | Warren | |
| 5,064,722 A | 11/1991 | Swofford | |
| 5,069,964 A * | 12/1991 | Tolliver | G02B 5/124 359/529 |
| 5,084,586 A | 1/1992 | Farooq | |
| 5,124,417 A | 6/1992 | Farooq | |
| 5,209,971 A | 5/1993 | Babu | |
| 5,214,119 A | 5/1993 | Leir | |
| 5,354,807 A * | 10/1994 | Dochniak | C08G 18/0804 524/591 |
| 5,356,745 A | 10/1994 | Sliemers | |
| 5,411,845 A | 5/1995 | Robinson | |
| 5,415,942 A | 5/1995 | Anderson | |
| 5,439,785 A | 8/1995 | Boston | |
| 5,448,404 A | 9/1995 | Schrenk | |
| 5,554,664 A | 9/1996 | Lamanna | |
| 5,591,820 A | 1/1997 | Kydonieus | |
| 5,672,637 A | 9/1997 | Mahoney | |
| 5,690,994 A | 11/1997 | Robinson | |
| 5,698,329 A | 12/1997 | Robinson | |
| 5,754,338 A * | 5/1998 | Wilson | B29C 66/1122 359/529 |
| 5,770,312 A | 6/1998 | Robinson | |
| 5,825,543 A | 10/1998 | Ouderkirk | |
| 5,828,488 A | 10/1998 | Ouderkirk | |
| 5,867,316 A | 2/1999 | Carlson | |
| 5,882,774 A | 3/1999 | Jonza | |
| 5,905,099 A * | 5/1999 | Everaerts | B32B 27/08 522/126 |
| 5,925,453 A * | 7/1999 | Kase | B32B 17/10009 428/323 |
| 6,045,894 A | 4/2000 | Jonza | |
| 6,179,948 B1 | 1/2001 | Merrill | |
| 6,187,524 B1 | 2/2001 | Park | |
| 6,224,975 B1 * | 5/2001 | Wang | C09J 7/22 428/354 |
| 6,352,761 B1 | 3/2002 | Hebrink | |
| 6,368,699 B1 | 4/2002 | Gilbert | |
| 6,498,683 B2 | 12/2002 | Condo | |
| 6,531,230 B1 | 3/2003 | Weber | |
| 6,744,561 B2 | 6/2004 | Condo | |
| 6,797,396 B1 | 9/2004 | Liu | |
| 6,827,886 B2 | 12/2004 | Neavin | |
| 6,888,677 B2 | 5/2005 | Condo | |
| 6,927,900 B2 | 8/2005 | Liu | |
| 6,972,813 B1 | 12/2005 | Toyooka | |
| 6,991,695 B2 | 1/2006 | Tait | |
| 7,141,297 B2 | 11/2006 | Condo | |
| 7,157,133 B2 | 1/2007 | Moran | |
| 7,189,447 B2 | 3/2007 | Conway | |
| 7,189,457 B2 | 3/2007 | Anderson | |
| 7,236,296 B2 | 6/2007 | Liu | |
| 7,238,401 B1 | 7/2007 | Dietz | |
| 7,297,407 B2 | 11/2007 | Anderson | |
| 7,727,633 B2 | 6/2010 | Kirkman | |
| 2001/0022982 A1 | 9/2001 | Neavin | |
| 2003/0152767 A1 | 8/2003 | Hawkins | |
| 2004/0234793 A1 | 11/2004 | Dietz | |
| 2006/0084780 A1 | 4/2006 | Hebrink | |
| 2006/0145127 A1 | 7/2006 | Lockridge | |
| 2006/0216524 A1 | 9/2006 | Klun | |
| 2006/0226561 A1 | 10/2006 | Merrill | |
| 2007/0047080 A1 | 3/2007 | Stover | |
| 2009/0000727 A1 | 1/2009 | Kumar | |
| 2009/0029129 A1 | 1/2009 | Pellerite | |
| 2011/0039099 A1 | 2/2011 | Sherman | |
| 2011/0081512 A1 | 4/2011 | Noda | |

FOREIGN PATENT DOCUMENTS

| | | |
|---|---|---|
| JP | 2007-126580 | 5/2007 |
| JP | 2010-260292 | 11/2010 |
| JP | 2011-230312 | 11/2011 |
| KR | 2000-0059284 | 10/2000 |
| KR | 2010/0067286 | 12/2008 |
| WO | WO 1995-17303 | 6/1995 |
| WO | WO 1995-17691 | 6/1995 |
| WO | WO 1995-17692 | 6/1995 |
| WO | WO 1995-17699 | 6/1995 |
| WO | WO 1996-19347 | 6/1996 |
| WO | WO 1997-01440 | 1/1997 |
| WO | WO 1999-36248 | 7/1999 |
| WO | WO 1999-36262 | 7/1999 |
| WO | WO 1999-39224 | 8/1999 |
| WO | WO 2000-75210 | 12/2000 |
| WO | WO 2005-058598 | 6/2005 |
| WO | WO 2006-118883 | 11/2006 |
| WO | WO 2006-130142 | 12/2006 |
| WO | WO 2009-105297 | 8/2009 |
| WO | WO 2009-123921 | 10/2009 |
| WO | WO 2009-123949 | 10/2009 |

* cited by examiner

PRIMER COMPOSITIONS FOR OPTICAL FILMS

FIELD OF THE DISCLOSURE

This disclosure relates generally to optical films and laminates, specifically to primer compositions suitable for improving adhesion to optical films.

BACKGROUND

A problem often encountered in the polymer film art relates to the difficulty of providing strong adhesion between substrates and functional coatings applied to them. This is particularly true for polyester-based substrates. To deal with the problem, a primer layer or coating is often applied to the polyester substrate to improve adhesion between the substrate and the functional coating.

Among the primer technologies that have been used to provide improved adhesion between polyester-based substrates and functional coatings applied to them are: the use of aminosilane coatings to improve the adhesion at subfreezing temperatures as described in U.S. Pat. No. 5,064,722 (Swofford et al.); PET (polyethylene terephthalate) films primed with polyallylamine coatings to improve adhesion to the PET film of a polyvinyl butyral or ionoplast resin layer, as described in U.S. Pat. No. 7,189,457 (Anderson); glass laminates for reduction of sound transmission that may include 3-layer laminates of polyester film positioned between two dissimilar polymer layers, as described in U.S. Pat. No. 7,297,407 (Anderson); and the primer layers for multi-layer optical films where the primer layer may include a sulfopolyester and a crosslinker, as described in PCT Publication No. WO 2009/123921.

SUMMARY

Disclosed herein are articles, including articles that are optical films and laminates. In some embodiments, the article comprises a substrate with a first polyester surface and a second polyester surface, a crosslinked polyurethane-based primer coated on the first polyester surface, and an optically clear heat activated adhesive adjacent to the crosslinked polyurethane-based primer. The crosslinked polyurethane-based primer, in some embodiments, comprises the reaction product of a polyurethane-based dispersion and a crosslinker.

In some embodiments, the articles comprise a substrate with a first polyester surface and a second polyester surface, a crosslinked polyurethane-based primer coated on the first and second polyester surfaces, and a pressure sensitive adhesive layer adjacent to the crosslinked polyurethane-based primer on the first polyester surface.

Also disclosed are laminate constructions comprising a first glazing substrate comprising a first major surface and a second major surface, a film article adhered to the first major surface of the first glazing substrate, the film article comprising a substrate with a first polyester surface and a second polyester surface, a first crosslinked polyurethane-based primer coated on the first polyester surface, and a second crosslinked polyurethane-based primer coated on the second polyester surface, and a first optically clear heat activated adhesive adjacent to the first crosslinked polyurethane-based primer and a layer adjacent to the second crosslinked polyurethane-based primer.

Methods of preparing an articles are also disclosed, the methods comprise providing a substrate with a first polyester surface and a second polyester surface, applying a curable primer composition onto at least one of the first polyester surface or the second polyester surface of the substrate, wherein the curable primer composition comprises a polyurethane-based dispersion and a crosslinker, drying the curable primer composition, heating while stretching the substrate and the curable primer composition to form a crosslinked primer layer on the stretched polyester surface, and applying an optically clear heat activated adhesive onto the crosslinked primer layer to form an optically clear heat activated adhesive layer.

DETAILED DESCRIPTION

The use of films for optical applications is increasing. A wide variety of optical films contain polyester surfaces. Optical films that contain polyester surfaces include polyester films, multi-layer films with exterior polyester film layers and films with a polyester coating or layer on the exterior surface or surfaces. It is desirable in many instances to surface treat the polyester surface of the films to aid in the ability of functional coating layers, such as adhesive layers, to adhere to the polyester surface of the films. This surface treatment can include physical surface treatment methods such as corona treatment, flame treatment and the like, or it can involve chemical treatment such as, for example, the application of a primer coating. Because the films are often used in optical applications, it is desirable that the surface treatment does not substantially alter the optical properties of the film. Not all of the above described techniques have been successfully used with polyester surfaces, so there still remains a need for new surface treatments for the polyester surfaces of films, such as optical films.

Heat activated adhesives are used extensively with optical films. Some classes of heat activated adhesives are particularly difficult to adhere to polyester surfaces. This is particularly true for heat activated adhesives such as polyvinylbutyral (PVB), a heat activated adhesive used extensively with optical films. The use of conventional adhesion enhancing techniques such as the use of surface treatments (for example corona or flame treatment) as well as the use of conventional primers, can sometimes improve the adhesion but they are not consistently useful. In particular, the non-suitability of a variety of conventional primers will be discussed in detail below as well as in the Examples section. Therefore, a need for primers that are able to enhance the adhesion of heat activated adhesives to polyester surfaces remains. In this disclosure, a class of polyurethane-based primers is described that are suitable for use with a wide range of polyester surfaces and heat activated adhesives. Additionally, because the polyurethane-based primers described herein can be applied so conveniently to polyester surfaces, they can also be applied to polyester surfaces that do not have heat activated adhesives applied to them to provide either enhanced adhesion of other types of coatings, or other properties. The primer coating can be advantageous even without the application of additional coatings because they can provide enhanced slipping over rollers and easier winding and unwinding of film rolls.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise. The term "adhesive" as used herein refers to polymeric compositions useful to adhere together two adherends. Examples of adhesives are heat activated adhesives and pressure sensitive adhesives.

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "(meth)acrylate" refers to monomeric acrylic or methacrylic esters of alcohols. Acrylate and methacrylate monomers or oligomers are referred to collectively herein as "(meth)acrylates". Polymers described as "(meth)acrylate-based" are polymers or copolymers prepared primarily (greater than 50% by weight) from (meth)acrylate monomers and may include additional ethylenically unsaturated monomers.

Unless otherwise indicated, "optically transparent" refers to an article, film or adhesive composition that has a high light transmittance over at least a portion of the visible light spectrum (about 400 to about 700 nm). The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Unless otherwise indicated, "optically clear" refers to an adhesive or article that has a high light transmittance over at least a portion of the visible light spectrum (about 400 to about 700 nm), and that exhibits low haze.

The term "urethane-based" as used herein refers to macromolecules that are copolymers or segmented copolymers which contain at least one urethane linkage. The urethane group has the general structure (—O—(CO)—NR—) where (CO) defines a carbonyl group C=O, and R is hydrogen or an alkyl group. The term "segmented copolymer" refers to a copolymer of linked segments, each segment constitutes primarily a single structural unit or type of repeating unit.

The term "adjacent" as used herein when referring to two layers means that the two layers are in proximity with one another with no intervening open space between them. They may be in direct contact with one another (e.g. laminated together) or there may be intervening layers.

Disclosed herein are articles that include a substrate with a first polyester surface and a second polyester surface, a crosslinked polyurethane-based primer coated on the first polyester surface, and an optically clear heat activated adhesive adjacent to the crosslinked polyurethane-based primer.

A wide range of substrates with a first and second polyester surface are suitable. In some embodiments, the substrate comprises a single polyester film. In other embodiments, the substrate comprises a film with an exterior coating or layer of polyester. In still other embodiments, the film comprises a multi-layer film with the exterior film layers being polyester layers.

Examples of suitable polyester films, include a wide range of films that incorporate polyester-containing polymers. Useful polyester polymers include, for example, polymers having terephthalate, isophthalate, and/or naphthalate comonomer units, e.g., polyethylene naphthalate (PEN), polyethylene terephthalate (PET) and copolymers and blends thereof. Examples of other suitable polyester copolymers are provided in the PCT Patent Publications WO 99/36262 and in WO 99/36248. A wide variety of suitable polyester materials, including amorphous polyester resins, are commercially available under the tradename VITEL from Bostik, Middleton, Mass., such as VITEL 1070B, 1750B, and 3300B, and under the tradename DYNAPOL from Evonik Degussa Corp., Parsippany, N.J., such as DYNAPOL S1313, S1421, S1420, S1606 and S1611. Other suitable polyester materials include polycarbonates, polyarylates, and other naphthalate and terephthalate-containing polymers, such as, for example, polybutylene naphthalate (PBN), polypropylene naphthalate (PPN), polybutylene terephthalate (PBT), polypropylene terephthalate (PPT), and blends and copolymers of any of the above with each other, with other polyesters, or with non-polyester polymers. The polymer films can contain multiple layers of the same or different polyester materials, or can be comprised of one or more non-polyester layers (as described below).

Examples of suitable films with an exterior coating or layer of polyester include multi-layer optical films with exterior polyester film layers. A wide variety of multi-layer optical films with exterior film layers that are polyester materials are suitable. These multi-layer optical films may comprise any of a variety of materials including polyesters as well as layers that are not polyesters, as long as the exterior surfaces comprise polyester film layers. Examples of suitable materials include polyesters such as polyethylene terephthalate, polyethylene naphthalate, copolyesters or polyester blends based on naphthalene dicarboxylic acids; polycarbonates; polystyrenes; styrene-acrylonitriles; cellulose acetates; polyether sulfones; poly(meth)acrylates such as polymethylmethacrylate; polyurethanes; polyvinyl chloride; polycyclo-olefins; polyimides; glass; paper; or combinations or blends thereof. Particular examples include polyethylene terephthalate, polymethyl methacrylate, polyvinyl chloride, and cellulose triacetate. In some embodiments, the multi-layer optical film comprises polyethylene terephthalate, polyethylene naphthalate, cellulose triacetate, polypropylene, polyester, polycarbonate, polymethylmethacrylate, polyimide, polyamide, or a blend thereof. Generally, the multi-layer optical film is sufficiently resistant to temperature and aging such that performance of the article is not compromised over time. The thickness of the multi-layer optical film is typically less than about 2.5 mm. The multi-layer optical film may also be an orientable film such as a cast web substrate that is coated before orientation in a tentering operation.

The multi-layer optical film is suitable for use in optical applications. Useful multi-layer optical films are designed to control the flow of light. They may have a transmission of greater than about 90%, and a haze value of less than about 5%, for example, less than 2%, or less than 1%. Properties to consider when selecting a suitable multi-layer optical film include mechanical properties such as flexibility, dimensional stability, self-supportability, and impact resistance. For example, the multi-layer optical film may need to be structurally strong enough so that the article can be assembled as part of a display device.

The multi-layer optical film may be used in a wide variety of applications such as graphic arts and optical applications. A useful multi-layer optical film may be described as a reflective film, a polarizer film, a reflective polarizer film, a diffuse blend reflective polarizer film, a diffuser film, a brightness enhancing film, a turning film, a mirror film, or a combination thereof. The multi-layer optical film may have ten or less layers, hundreds, or even thousands of layers, the layers being composed of some combination of all birefringent optical layers, some birefringent optical layers, or all isotropic optical layers. In one embodiment, the multi-layer optical film has alternating layers of first and second optical layers, wherein the first and second optical layers have refractive indices along at least one axis that differ by at least 0.04. Multi-layer optical films having refractive index mismatches are described in the references cited below. In another embodiment, the multi-layer optical film may comprise one or more layers of any of the above multi-layer optical films such that the primer layer is buried in any one of them, making the article itself a reflective film, a polarizer film, a reflective polarizer film, a diffuse blend reflective polarizer film, a diffuser film, a brightness enhancing film, a turning film, a mirror film, or a combination thereof. The optical film may contain a microstructured surface. In some embodiments, the optical film may contain a microstructured surface to redirect visible light.

Useful multi-layer optical films include commercially available optical films marketed as VIKUITI Dual Brightness Enhanced Film (DBEF), VIKUITI Brightness Enhanced Film (BEF), VIKUITI Diffuse Reflective Polarizer Film (DRPF), VIKUITI Enhanced Specular Reflector (ESR), and VIKUITI Advanced Polarizing Film (APF), all available from 3M Company, St. Paul, Minn. Useful optical films are also described in U.S. Pat. Nos. 5,825,543; 5,828,488 (Ouderkirk et al); U.S. Pat. Nos. 5,867,316; 5,882,774; 6,179,948 B1 (Merrill et al); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/0047080 A1 (Stover et al.); WO 95/17303; WO 95/17691; WO95/17692; WO 95/17699; WO 96/19347; WO 97/01440; WO 99/36248; and WO99/36262. These multi-layer optical films are merely illustrative and are not meant to be an exhaustive list of suitable multi-layer optical films that can be used.

The articles of this disclosure also include a crosslinked polyurethane-based primer coated on the first polyester surface. In some embodiments, the crosslinked polyurethane-based primer is coated on both polyester surfaces. In other embodiments, the second polyester surface contains a surface treatment that is not a primer coating. Such non-primer surface treatments include, for example, flame treatments, plasma treatments, and corona treatments.

The primer on the first polyester surface is present to facilitate adhesion between the polyester film layer and the optically clear heat activated adhesive layer. It has been observed that it is often difficult for heat activated adhesive layers to adhere well to polyester films. In some instances, surface treatments such as corona, flame or plasma treatments can sufficiently alter the surface of the polyester film that heat activated adhesives can adhere to them. However, it is frequently the case that such surface treatments are either not sufficient to provide adequate adhesion or are ineffective to improve adhesion. Therefore, the polyurethane-based primers of this disclosure were developed. The polyurethane-based primers comprise the reaction product of a polyurethane-based dispersion and a polyisocyanate crosslinker.

The polyurethane-based dispersion consists of, consists primarily of, or at least comprises a solvent-based or a water-based polyurethane. In some embodiments, the polyurethane is a polyester-based polyurethane, a polycarbonate-based polyurethane or a combination or blend of both. The water-based polyurethane can be made from an aqueous-based polyurethane dispersion (i.e., PUD), and the solvent-based polyurethane can be made from a solvent-based polyurethane solution (i.e., PUS). It may be desirable to use PUDs, because of the elimination of the volatile solvents typically associated with using PUSs. Particularly desirable PUDs are polycarbonate-based polyurethanes and polyester-based polyurethanes. Examples of particularly suitable PUDs are described in the PCT Publication WO 2006/118883 (Ho et al.)

The polyurethane can be the reaction product of one or more polyol segments and one or more diisocyanate segments. It may be desirable for one or more triisocyanate segments to be used with the diisocyanate. It may be desirable to use up to about 10%, based on the total weight of the reaction components, of triisocyanate segments with the diisocyanate. In some embodiments, the polyol is a polyester polyol, a polycarbonate polyol or a combination of both. It has also been found desirable to use a diisocyanate such as, for example, isophorone diisocyanate, bis (4-isocyanato-cyclohexyl) methane or a combination of both.

The use of aliphatic materials in the present primer composition is generally desirable, particularly when the primer compositions are used in applications such as window glazing applications. Examples of suitable materials include an aliphatic water-based polyurethane, an aliphatic polycaprolactone-based thermoplastic polyurethane or both. Thus, in making the polyurethane, it can be desirable to use one or a combination of aliphatic polyols, aliphatic diisocyanates and aliphatic triisocyanates.

The polyurethane-based primers also comprise a crosslinker. The crosslinker may be a multi-functional isocyanate-functional material or a melamine formaldehyde crosslinker such as CYMEL 327 commercially available from Cytec Industries, Inc., Woodland Park, N.J. In many embodiments, the crosslinkers are multifunctional isocyanate-functional compounds. The multifunctional isocyanate-functional compounds comprise at least two isocyanate groups (diisocyanates) and may contain more than two isocyanate groups (triisocyantes, tetraisocyanates, etc.). Examples of suitable diisocyanates include, but are not limited to, aromatic diisocyanates, such as 2,6-toluene diisocyanate, 2, 5-toluene diisocyanate, 2, 4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3', 5, 5'-tetraethyl) biphenylmethane, 4,4'-diisocyanato-3,3'-dimethoxybiphenyl, 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5diisocyanatopentane, and cycloaliphatic diisocyanates such as methylene-dicyclohexylene-4,4'-diisocyanate, and 3-isocyanatomethyl-3,5,5-trimethyl-cyclohexyl isocyanate (isophorone diisocyanate).

Suitable tri-isocyanates include aliphatic and aromatic triisocyanates and examples of such compounds include the aliphatic triisocyanate 1,3,6-hexamethylenetriisocyanate, and the aromatic tri-isocyanate polymethylenepolyphenylisocyanate (PAPI).

Also useful are isocyanates that contain internal, isocyanate-derived moieties such as biuret-containing tri-isocyanates (e.g., DESMODUR N-100, available from Bayer), isocyanurate-containing tri-isocyanates (e.g., IPDI-1890 available from Huls AG, Germany), and azetedinedione-containing diisocyanates (e.g., DESMODUR TT available from Bayer). Also suitable are other di- or tri-isocyanates such as DESMODUR L and DESMODUR W (both available from Bayer), and tri-(4-isocyanatophenyl)-methane (available from Bayer as DESMODUR R).

Typically, the polyisocyanate crosslinker comprises an aliphatic diisocyanate, a blocked isocyanate, or a combination thereof. Particularly suitable polyisocyanate crosslinkers are the aliphatic isocyanate crosslinkers commercially available from Bayer Material Science under the trade name "BAYHYDOR", such as BAYHYDOR 303, BAYHYDOR 305, BAYHYDOR 401-70, BAYHYDOR XP2487/1, and BAYHYDOR XP7165, and those available from Perstorp Polyols, Inc. Toledo, Ohio under the trade name "ESAQUA" such as ESAQUA XD 401, and ESAQUA XM 501.

Examples of suitable blocked isocyanates include those commercially available from Bayer Material Science under the trade names BAYHYDOR VPLS 2310, and BAYHYDOR BL 5335, as well as those available from Baxenden Chemicals Limited under the trade names TRIXENE B1 7986, and TRIXENE B1 7987.

A wide variety of optically clear heat activated adhesives can be used in conjunction with the polyurethane-based primers described above. Examples of suitable optically clear heat activated adhesives include polyacrylate hot melt adhesives, polyvinyl butyrals, ethylene vinyl acetate, ionomers, polyolefins, or combinations thereof.

The optically clear heat activated adhesives may be (meth)acrylate-based hot melt adhesives. The hot melt adhesives typically are prepared from (meth)acrylate polymers that have a glass transition temperature (Tg) of greater than room temperature, more typically greater than about 40° C., and are prepared from alkyl (meth)acrylate monomers. Useful alkyl (meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic hot melt adhesives may also contain optional co-monomer components such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

In some embodiments, the adhesive layer is at least partially formed of polyvinyl butyral. The polyvinyl butyral layer may be formed via known aqueous or solvent-based acetalization process in which polyvinyl alcohol is reacted with butyraldehyde in the presence of an acidic catalyst. In some instances, the polyvinyl butyral layer may include or be formed from polyvinyl butyral that is commercially available from Solutia Incorporated, of St. Louis, Mo., under the trade name "BUTVAR" resin.

In some instances, the polyvinyl butyral layer may be produced by mixing resin and (optionally) plasticizer and extruding the mixed formulation through a sheet die. If a plasticizer is included, the polyvinyl butyral resin may include about 20 to 80 or perhaps about 25 to 60 parts of plasticizer per hundred parts of resin. Examples of suitable plasticizers include esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyl adipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217.

Examples of suitable ethylene vinyl acetate (EVA) adhesives include a wide range of commercially available EVA hot melt adhesives. Typically these EVA hot melt adhesives have a vinyl acetate content of from about 18-29% by weight of the polymer. The adhesives typically have high amounts of tackifiers and waxes. An exemplary composition is one with 30-40% by weight of EVA polymer, 30-40% by weight of tackifier, 20-30% by weight of wax, and 0.5-1% by weight of stabilizers. Examples of suitable EVA hot melt adhesives are the BYNEL SERIES 3800 resins commercially available from DuPont, Wilmington, Del. (including BYNEL 3810, BYNEL 3859, BYNEL 3860, and BYNEL 3861). A particularly suitable EVA hot melt adhesive is the material available from Bridgestone Corp. Tokyo, JP under the trade name "EVASAFE".

Examples of suitable ionomeric adhesives are the "ionoplast resins". Ionoplast resins are copolymers of ethylene and unsaturated carboxylic acids, wherein at least a portion of the acid groups in the copolymer have been neutralized to the salt form of the acid. Extruded sheets of ionoplast resins suitable for use in this disclosure are commercially available from DuPont Chemicals, Wilmington, Del., under the trade name "SENTRYGLASS PLUS".

Examples of suitable polyolefin adhesives include ethylene/α-olefin copolymers. As used herein, the term "ethylene/α-olefin copolymer" refers to polymers comprising a class of hydrocarbons manufactured by the catalytic oligomerization (i.e., polymerization to low-molecular-weight products) of ethylene and linear α-olefin monomers. The ethylene/α-olefin copolymers may be made, for example, with a single site catalyst such as a metallocene catalyst or multi-site catalysts such as Ziegler-Natta and Phillips catalysts. The linear α-olefin monomers typically are 1-butene or 1-octene but may range from C3 to C20 linear, branched or cyclic α-olefin. The α-olefin may be branched but only if the branch is at least alpha to the double bond, such as 3-methyl-1-pentene. Examples of C3-C20 α-olefins include propylene, 1-butene, 4-methyl-1-butene, 1-hexene, 1-octene, 1-dodecene, 1-tetradecene, 1-hexadecene and 1-octadecene. The α-olefins can also contain a cyclic structure such as cyclohexane or cyclopentane, resulting in an α-olefin such as 3-cyclohexyl-1 propene (allyl cyclohexane) and vinyl cyclohexane. Although not α-olefins in the classical sense of the term, for purposes of this disclosure certain cyclic olefins, such as norbornene and related olefins, are α-olefins and can be used. Similarly, styrene and its related olefins (for example, α-methyl styrene) are α-olefins for the purposes of this disclosure. Acrylic and methacrylic acid and their respective ionomers, and acrylates and methacrylates, however are not α-olefins for the purposes of this disclosure. Illustrative ethylene/α-olefin copolymers include ethylene/1-butene, ethylene/1-octene, ethylene/1-butene/1-octene, ethylene/styrene. The polymers can be block or random. Exemplary commercially available low crystalline ethylene/α-olefin copolymers include resins sold under the tradenames "ENGAGE" ethylene/1-butene and ethylene/1-octene copolymers and "FLEXOMER" ethylene/1-hexene copolymer, available from Dow Chemical Co., and homogeneously branched, substantially linear ethylene/α-olefin copolymers such as "TAFMER", available from Mitsui Petrochemicals Company Limited, and "EXACT", available from ExxonMobil Corp. As used herein, the term "copolymer" refers to polymers made from at least 2 monomers.

In some of these embodiments, the α-olefin moiety of the ethylene/α-olefin copolymer includes four or more carbons. In some embodiments, the ethylene/α-olefin copolymer is a low crystalline ethylene/α-olefin copolymer. As used herein, the term "low crystalline" means crystallinity (according to method disclosed in ASTM F2625-07) of less than 50% by weight. In some embodiments, the low crystalline ethylene/α-olefin copolymer is a butene α-olefin. In some embodiments the α-olefin of the low crystalline ethylene/α-olefin copolymer has 4 or more carbons.

In some embodiments, the low crystalline ethylene/α-olefin copolymer has a DSC peak melting point of less than or equal to 50° C. As used herein, the term "DSC peak melting point" means a melting point determined by DSC (10°/min) under nitrogen purge as the peak with the largest area under the DSC curve.

As described above, the articles of this disclosure may also comprise a crosslinked polyurethane-based primer coated on the second polyester surface of the substrate. This crosslinked polyurethane-based primer may be the same as the crosslinked polyurethane-based primer coated on the first polyester surface of the substrate or it may be different. Typically, the crosslinked polyurethane-based primers are the same for ease of applying and handling. Suitable crosslinked polyurethane-based primers are described in detail above.

As with the first polyester surface of the substrate, the crosslinked polyurethane-based primer coating on the second polyester surface of the substrate may also have a layer adjacent to the crosslinked polyurethane-based primer coating. This layer may comprise an optically clear heat activated adhesive layer, a cured hardcoat layer, an optical layer, or a pressure sensitive adhesive layer.

Optically clear heat activated adhesives are described in detail above. If the layer adjacent to the crosslinked polyurethane-based primer coating on the second polyester surface of the substrate is an optically clear heat activated adhesive, it may the same as or different from the optically clear heat activated adhesive adjacent to the crosslinked polyurethane-based primer coating on the first polyester surface of the substrate.

In some embodiments, it may be desirable that the second polyester surface contain a layer other than an optically clear heat activated adhesive, such as a cured hardcoat layer, an optical layer or a pressure sensitive adhesive layer.

Hardcoats are coatings placed on surfaces generally to provide protection such as abrasion and graffiti resistance. Typically, the hardcoat surfaces are optically transparent. The hardcoat layer can be made from any suitably curable polymeric material. As used herein, "polymeric material" will be understood to include polymers, copolymers (for example, polymers formed using two or more different monomers), oligomers, and combinations thereof, as well as polymers, copolymers, or oligomers that can be formed in a miscible blend. An example of a suitable material for the hardcoat layer is a multifunctional or cross-linkable monomer. Examples of suitable hardcoat layers include those described in US Patent Publication No. 2009/0000727 (Kumar et al.).

Examples of cross-linkable monomers include multifunctional acrylates, urethanes, urethane acrylates, siloxanes, and epoxies. In some embodiments, cross-linkable monomers include mixtures of multifunctional acrylates, urethane acrylates, or epoxies.

Useful acrylates include, for example, poly(meth)acryl monomers such as, for example, di(meth)acryl containing compounds, tri(meth)acryl containing compounds, higher functionality (meth)acryl containing compounds and oligomeric(meth)acryl compounds.

Suitable di(meth)acryl containing compounds include 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, and tripropylene glycol diacrylate.

Suitable tri(meth)acryl containing compounds include glycerol triacrylate, trimethylolpropane triacrylate, ethoxylated triacrylates (for example, ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (for example, propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, pentaerythritol triacrylate, and tris(2-hydroxyethyl)isocyanurate triacrylate.

Suitable higher functionality (meth)acryl containing compounds include ditrimethylolpropane tetraacrylate, dipentaerythritol pentaacrylate, ethoxylated (4) pentaerythritol tetraacrylate, pentaerythritol tetraacrylate, and caprolactone modified dipentaerythritol hexaacrylate.

Suitable oligomeric(meth)acryl compounds include urethane acrylates, polyester acrylates, epoxy acrylates; polyacrylamide analogues of the foregoing such as, for example, N,N-dimethyl acrylamide; and combinations thereof.

Many poly(meth)acryl monomers are widely available from vendors such as, for example, Sartomer Company, Exton, Pa.; UCB Chemicals Corporation, Smyrna, Ga.; and Aldrich Chemical Company, Milwaukee, Wis. Additional useful (meth)acrylate materials include hydantoin moiety-containing poly(meth)acrylates, for example, as described in U.S. Pat. No. 4,262,072 (Wendling et al.).

In an illustrative embodiment, the hardcoat layer includes a monomer having at least two or three (meth)acrylate functional groups. Commercially available cross-linkable acrylate monomers include those available from Sartomer Company, Exton, Pa. such as trimethylolpropane triacrylate available under the trade designation SR351, pentaerythritol triacrylate available under the trade designation SR444, dipentaerythritol triacrylate available under the trade designation SR399LV, ethoxylated (3) trimethylolpropane triacrylate available under the trade designation SR454, ethoxylated (4) pentaerythritol triacrylate, available under the trade designation SR494, tris(2-hydroxyethyl)isocyanurate triacrylate, available under the trade designation SR368, and dipropylene glycol diacrylate, available under the trade designation SR508.

Useful urethane acrylate monomers include, for example, a hexafunctional urethane acrylate available as EBECRYL 8301 from Radcure UCB Chemicals (Smyrna, Ga.), CN981 and CN981B88 available from Sartomer Company (Exton, Pa.), and a difunctional urethane acrylate available as EBECRYL 8402 from Radcure UCB Chemicals. In some embodiments the hardcoat layer resin includes both poly(meth)acrylate and polyurethane material, which can be termed a "urethane acrylate."

In some embodiments, the hardcoat layer can include a plurality of inorganic nanoparticles. The inorganic nanoparticles can include, for example, silica, alumina, or zirconia (the term "zirconia" includes zirconia metal oxide) nanoparticles. In some embodiments, the nanoparticles have a mean diameter in a range from 1 to 200 nm, or 5 to 150 nm, or 5 to 125 nm. Nanoparticles can be present in an amount from 10 to 200 parts per 100 parts of hardcoat layer monomer.

Useful silica nanoparticles are commercially available from Nalco Chemical Co. (Naperville, Ill.) under the product designation NALCO COLLOIDAL SILICAS. For example, silicas include NALCO products 1040, 1042, 1050, 1060, 2327 and 2329. Useful zirconia nanoparticles are commercially available from Nalco Chemical Co. (Naperville, Ill.) under the product designation NALCO OOSSOO8.

Surface treating or surface modification of the nanoparticles can provide a stable dispersion in the hardcoat layer resin. The surface-treatment can stabilize the nanoparticles so that the particles will be well dispersed in the polymerizable resin and result in a substantially homogeneous composition. Furthermore, the nanoparticles can be modified over at least a portion of its surface with a surface treatment agent so that the stabilized particle can copolymerize or react with the polymerizable hardcoat layer resin during curing.

A photoinitiator can be included in the hardcoat layer. Examples of initiators include organic peroxides, azo compounds, quinines, nitro compounds, acyl halides, hydrazones, mercapto compounds, pyrylium compounds, imidazoles, chlorotriazines, benzoin, benzoin alkyl ethers, di-ketones, phenones, and the like. Commercially available photoinitiators include those available commercially from Ciba Geigy under the trade designations DAROCUR 1173, DAROCUR 4265, IRGACURE 651, IRGACURE 184, IRGACURE 1800, IRGACURE 369, IRGACURE 1700, IRGACURE 907, IRGACURE 819 and from Aceto Corp. (Lake Success, N.Y.) under the trade designations UV1-6976 and UV1-6992. Phenyl-[p-(2-hydroxytetradecyloxy) phenyl]iodonium hexafluoroantomonate is a photoinitiator commercially available from Gelest (Tullytown, Pa.). Phosphine oxide derivatives include LUCIRIN TPO, which is 2,4,6-trimethylbenzoy diphenyl phosphine oxide, available from BASF (Charlotte, N.C.). In addition, further useful photoinitiators are described in U.S. Pat. Nos. 4,250,311, 3,708,296, 4,069,055, 4,216,288, 5,084,586, 5,124,417, 5,554,664, and 5,672,637. A photoinitiator can be used at a concentration of about 0.1 to 10 weight percent or about 0.1 to 5 weight percent based on the organic portion of the formulation (phr).

Examples of optical layers include virtually any layer that is used to control light. These include a wide array of optical films as well as coating layers. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, infrared reflective films, ultraviolet reflective films, reflective polarizer films such as a brightness enhancement films and dual brightness enhancement films, absorptive polarizer films, optically clear films, tinted films, and antireflective films. The optical film may contain a microstructured surface. In some embodiments, the optical film may contain a microstructured surface to redirect visible light.

In some embodiments the optical layer may be a coating or may include an optical film that has a coating. In general, coatings are used to enhance the function of the film or provide additional functionality to the film. Examples of coatings include, for example, hardcoats (as described above), anti-fog coatings, anti-scratch coatings, privacy coatings or a combination thereof. Coatings such as hardcoats, anti-fog coatings, and anti-scratch coatings that provide enhanced durability. Examples of privacy coatings include, for example, blurry or hazy coatings to give obscured viewing or louvered films to limit the viewing angle.

Suitable pressure sensitive adhesives include those based on natural rubbers, synthetic rubbers, styrene block copolymers, polyvinyl ethers, acrylics, poly-$\alpha$-olefins, silicones, urethanes or ureas.

Useful natural rubber pressure sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade.

Tackifying resins used with natural rubbers generally include but are not limited to wood rosin and its hydrogenated derivatives; terpene resins of various softening points, and petroleum-based resins, such as, the "ESCOREZ 1300" series of C5 aliphatic olefin-derived resins from Exxon, and "PICCOLYTE S" series, polyterpenes from Hercules, Inc.

Antioxidants are used to retard the oxidative attack on natural rubber, which can result in loss of the cohesive strength of the natural rubber adhesive. Useful antioxidants include but are not limited to amines, such as N—N' di-ß-naphthyl-1,4-phenylenediamine, available as "AGERITE D"; phenolics, such as 2,5-di-(t-amyl) hydroquinone, available as "SANTOVAR A", available from Monsanto Chemical Co., tetrakis[methylene 3-(3',5'-di-tert-butyl-4'-hydroxyphenyl)propianate]methane, available as "IRGANOX 1010" from Ciba-Geigy Corp., and 2-2'-methylenebis(4-methyl-6-tert butyl phenol), available as Antioxidant 2246; and dithiocarbamates, such as zinc dithiodibutyl carbamate. Other materials can be added to natural rubber adhesives for special purposes, wherein the additions can include plasticizers, pigments, and curing agents to partially vulcanize the pressure sensitive adhesive.

Another useful class of pressure sensitive adhesives are those comprising synthetic rubber. Such adhesives are generally rubbery elastomers, which are either self-tacky or non tacky and require tackifiers.

Self-tacky synthetic rubber pressure sensitive adhesives include for example, butyl rubber, a copolymer of isobutylene with less than 3 percent isoprene, polyisobutylene, a homopolymer of isoprene, polybutadiene, such as "TAK-TENE 220 BAYER" or styrene/butadiene rubber. Butyl rubber pressure sensitive adhesives often contain an antioxidant such as zinc dibutyl dithiocarbamate. Polyisobutylene pressure sensitive adhesives do not usually contain antioxidants. Synthetic rubber pressure sensitive adhesives, which generally require tackifiers, are also generally easier to melt process. They comprise polybutadiene or styrene/butadiene rubber, from 10 parts to 200 parts of a tackifier, and generally from 0.5 to 2.0 parts per 100 parts rubber of an antioxidant such as "IRGANOX 1010". An example of a synthetic rubber is "AMERIPOL 1011A", a styrene/butadiene rubber available from BF Goodrich. Tackifiers that are useful include derivatives of rosins such as "FORAL 85", a stabilized rosin ester from Hercules, Inc., the "SNOWTACK" series of gum rosins from Tenneco, and the "AQUATAC" series of tall oil rosins from Sylvachem; and synthetic hydrocarbon resins such as the "PICCOLYTE A" series, polyterpenes from Hercules, Inc., the "ESCOREZ 1300" series of $C_5$ aliphatic olefin-derived resins, the "ESCOREZ 2000" Series of $C_9$ aromatic/aliphatic olefin-derived resins, and polyaromatic $C_9$ resins, such as the "PICCO 5000" series of aromatic hydrocarbon resins, from Hercules, Inc. Other materials can be added for special purposes, including hydrogenated butyl rubber, pigments, plasticizers, liquid rubbers, such as "VISTANEX LMMH" polyisobutylene liquid rubber available from Exxon, and curing agents to vulcanize the adhesive partially.

Styrene block copolymer pressure sensitive adhesives generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure sensitive adhesives include linear, radial, star and tapered styrene-isoprene block copolymers such as "KRATON D1107P", available from Shell Chemical Co., and "EUROPRENE SOL TE 9110", available from EniChem Elastomers Americas, Inc.; linear styrene-(ethylene-butylene) block copolymers such as "KRATON G1657", available from Shell Chemical Co.; linear styrene-(ethylene-propylene) block copolymers such as "KRATON G1750X", available from Shell Chemical Co.; and linear, radial, and star styrene-butadiene block copolymers such as "KRATON D1118X", available from Shell Chemical Co., and "EUROPRENE SOL TE 6205", available from EniChem Elastomers Americas, Inc. The polystyrene blocks tend to form domains in the shape of spheroids, cylinders, or plates that causes the block copolymer pressure sensitive adhesives to have two phase structures. Resins that associate with the rubber phase generally develop tack in the pressure sensitive adhesive. Examples of rubber phase associating resins include aliphatic olefin-derived resins, such as the "ESCOREZ 1300" series and the "WINGTACK" series, available from Goodyear; rosin esters, such as the "FORAL" series and the "STAYBELITE" Ester 10, both available from Hercules, Inc.; hydrogenated hydrocarbons, such as the "ESCOREZ 5000" series, available from Exxon; polyterpenes, such as the "PICCOLYTE A" series; and terpene phenolic resins derived from petroleum or terpentine sources, such as "PICCOFYN A100", available from Hercules, Inc. Resins that associate with the thermoplastic phase tend to stiffen the pressure sensitive adhesive. Thermoplastic phase associating resins include polyaromatics, such as the "PICCO 6000" series of aromatic hydrocarbon resins, available from Hercules, Inc.; coumarone-indene resins, such as the "CUMAR" series, available from Neville; and other high-solubility parameter resins derived from coal tar or petroleum and having softening points above about 85° C., such as the "AMOCO 18" series of alphamethyl styrene resins, available from Amoco, "PICCOVAR 130" alkyl aromatic polyindene resin, available from Hercules, Inc., and the "PICCOTEX" series of alphamethyl styrene/vinyl toluene resins, available from Hercules. Other materials can be added for special purposes, including rubber phase plasticizing hydrocarbon oils, such as, "TUFFLO 6056", available from Lydondell Petrochemical Co., Polybutene-8 from Chevron, "KAYDOL", available from Witco, and "SHELL-FLEX 371", available from Shell Chemical Co.; pigments; antioxidants, such as "IRGANOX 1010" and "IRGANOX 1076", both available from Ciba-Geigy Corp., "BUTAZATE", available from Uniroyal Chemical Co., "CYANOX LDTP", available from American Cyanamid, and "BUTASAN", available from Monsanto Co.; antiozonants, such as "NBC", a nickel dibutyldithiocarbamate, available from DuPont; liquid rubbers such as "VISTANEX LMMH" polyisobutylene rubber; and ultraviolet light inhibitors, such as "IRGANOX 1010" and "TINUVIN P", available from Ciba-Geigy Corp.

Polyvinyl ether pressure sensitive adhesives are generally blends of homopolymers of vinyl methyl ether, vinyl ethyl ether or vinyl iso-butyl ether, or blends of homopolymers of vinyl ethers and copolymers of vinyl ethers and acrylates to achieve desired pressure sensitive properties. Depending on the degree of polymerization, homopolymers may be viscous oils, tacky soft resins or rubber-like substances. Polyvinyl ethers used as raw materials in polyvinyl ether adhesives include polymers based on: vinyl methyl ether such as "LUTANOL M 40", available from BASF, and "GANTREZ M 574" and "GANTREZ 555", available from ISP Technologies, Inc.; vinyl ethyl ether such as "LUTANOL A 25", "LUTANOL A 50" and "LUTANOL A 100"; vinyl isobutyl ether such as "LUTANOL 130", "LUTANOL 160", "LUTANOL IC", "LUTANOL 160D" and "LUTANOL I 65D"; methacrylate/vinyl isobutyl ether/acrylic acid such as "ACRONAL 550 D", available from BASF. Antioxidants useful to stabilize the polyvinylether pressure sensitive adhesive include, for example, "IONOX 30" available from Shell, "IRGANOX 1010" available from Ciba-Geigy, and antioxidant "ZKF" available from Bayer Leverkusen. Other materials can be added for special purposes as described in BASF literature including tackifier, plasticizer and pigments.

Acrylic pressure sensitive adhesives generally have a glass transition temperature of about −20° C. or less and may comprise from 100 to 80 weight percent of a $C_3$-$C_{12}$ alkyl ester component such as, for example, isooctyl acrylate, 2-ethyl-hexyl acrylate and n-butyl acrylate and from 0 to 20 weight percent of a polar component such as, for example, acrylic acid, methacrylic acid, ethylene vinyl acetate, N-vinyl pyrrolidone and styrene macromer. Generally, the acrylic pressure sensitive adhesives comprise from 0 to 20 weight percent of acrylic acid and from 100 to 80 weight percent of isooctyl acrylate. The acrylic pressure sensitive adhesives may be self-tacky or tackified. Useful tackifiers for acrylics are rosin esters such as "FORAL 85", available from Hercules, Inc., aromatic resins such as "PICCOTEX LC-55WK", aliphatic resins such as "PICCOTAC 95", available from Hercules, Inc., and terpene resins such as α-pinene and ß-pinene, available as "PICCOLYTE A-115" and "ZONAREZ B-100" from Arizona Chemical Co. Other materials can be added for special purposes, including hydrogenated butyl rubber, pigments, and curing agents to vulcanize the adhesive partially.

Poly-α-olefin pressure sensitive adhesives, also called a poly(l-alkene) pressure sensitive adhesives, generally comprise either a substantially uncrosslinked polymer or a uncrosslinked polymer that may have radiation activatable functional groups grafted thereon as described in U.S. Pat. No. 5,209,971 (Babu, et al) which is incorporated herein by reference. The poly-α-olefin polymer may be self tacky and/or include one or more tackifying materials. If uncrosslinked, the inherent viscosity of the polymer is generally between about 0.7 and 5.0 dL/g as measured by ASTM D 2857-93, "Standard Practice for Dilute Solution Viscosity of Polymers". In addition, the polymer generally is predominantly amorphous. Useful poly-α-olefin polymers include, for example, $C_3$-$C_{18}$ poly(l-alkene) polymers, generally $C_5$-$C_{12}$ α-olefins and copolymers of those with $C_3$ or $C_6$-$C_8$ and copolymers of those with $C_3$. Tackifying materials are typically resins that are miscible in the poly-α-olefin polymer. The total amount of tackifying resin in the poly-α-olefin polymer ranges between 0 to 150 parts by weight per 100 parts of the poly-α-olefin polymer depending on the specific application. Useful tackifying resins include resins derived by polymerization of $C_5$ to $C_9$ unsaturated hydrocarbon monomers, polyterpenes, synthetic polyterpenes and the like. Examples of such commercially available resins based on a $C_5$ olefin fraction of this type are "WINGTACK 95" and "WINGTACK 15" tackifying resins available from Goodyear Tire and Rubber Co. Other hydrocarbon resins include "REGALREZ 1078" and "REGALREZ 1126" available from Hercules Chemical Co., and "ARKON P115" available from Arakawa Chemical Co. Other materials can be added for special purposes, including antioxidants, fillers, pigments, and radiation activated crosslinking agents.

Silicone pressure sensitive adhesives comprise two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups (OSiMe$_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif. Manufacture of typical silicone pressure sensitive adhesives is described in U.S. Pat. No. 2,736,721 (Dexter). Manufacture of silicone urea block copolymer pressure sensitive adhesive is described in U.S. Pat. No. 5,214,119 (Lein, et al). Other materials can be added for special purposes, including, pigments, plasticizers, and fillers. Fillers are typically used in amounts from 0 parts to 10 parts per 100 parts of silicone pressure sensitive adhesive. Examples of fillers that can be used include zinc oxide, silica, carbon black, pigments, metal powders and calcium carbonate.

Useful polyurethane and polyurea pressure sensitive adhesives useful include, for example, those disclosed in WO 00/75210 (Kinning et al.) and in U.S. Pat. No. 3,718,712 (Tushaus); U.S. Pat. No. 3,437,622 (Dahl); and U.S. Pat. No. 5,591,820 (Kydonieus et al.).

Also disclosed are articles that include a substrate with a first polyester surface and a second polyester surface, a crosslinked polyurethane-based primer coated on the first polyester surface, and a pressure sensitive adhesive layer adjacent to the crosslinked polyurethane-based primer, instead of a heat activated adhesive. Examples of suitable pressure sensitive adhesives include those described above.

As with the articles described above, the second polyester surface of the substrate may also comprise a crosslinked polyurethane-based primer coating. This crosslinked polyurethane-based primer may be the same as the crosslinked polyurethane-based primer coated on the first polyester surface of the substrate or it may be different. Typically, the crosslinked polyurethane-based primers are the same for ease of applying and handling. Suitable crosslinked polyurethane-based primers are described in detail above.

The film articles described above that comprise a substrate with a first polyester surface and a second polyester surface and crosslinked polyurethane-based primers coated on the first and second polyester surfaces can be used to prepare laminate articles. In these laminate articles the film articles are adhered to a glazing substrate.

A wide variety of glazing substrates are suitable in the laminate articles of this disclosure. In some embodiments, a single glazing substrate is present, in other embodiments, multiple glazing substrates are present. In some embodiments the primed film articles described above are attached to an exterior surface of a glazing substrate, and in other embodiments, the primed film articles described above are located between two glazing substrates.

Suitable glazing substrates are at least optically transparent, and may be optically clear. Examples of suitable substrates include, for example, windows. Windows may be made of a variety of different types of glazing substrates such as a variety of glasses or from polymeric materials such as polycarbonate or polymethyl methacrylate. In some embodiments, the window may also comprise additional layers or treatments. Examples of additional layers include, for example, additional layers of film designed to provide tinting, shatter resistance and the like. Examples of additional treatments that may be present of windows include, for example, coatings or various types such as hardcoats, and etchings such as decorative etchings.

In some embodiments, both the first and second crosslinked polyurethane-based primer coatings have optically clear heat activated adhesive layers adjacent to the primer coating. In other embodiments, one of polyurethane-based primer coatings has an optically clear heat activated adhesive layer adjacent to the primer coating and the other polyurethane-based primer coating has a layer adjacent to the primer layer. The layer may be a cured hardcoat, an optical layer, or a pressure sensitive adhesive, as described above. Articles with two layers of optically clear heat activated adhesive or a layer of optically clear heat activated adhesive and a layer of pressure sensitive adhesive, can be used to prepare sandwich laminates, i.e. where the film article is between two glazing substrates.

Typically the laminates have desirable optical properties such as high luminous transmission and low haze. Often the laminates of this disclosure have a luminous transmission of at least about 90 percent and a haze of less than about 3 percent in the 400 to 700 nm wavelength range. Both the luminous transmission and the haze can be determined using, for example, the method of ASTM-D 1003-95.

Also disclosed are methods for preparing articles. These methods include providing a substrate with a first polyester surface and a second polyester surface, coating a curable primer composition onto at least one of the first polyester surface or the second polyester surface of the substrate, drying the curable primer composition, heating while stretching the substrate and the curable primer composition to form a crosslinked primer layer on the stretched polyester surface, and applying an optically clear heat activated adhesive onto the crosslinked primer layer to form an optically clear heat activated adhesive layer. Because the curable primer composition is coated on the substrate prior to heating while stretching (a process referred to as "tentering"), the curable primer coating is sometimes referred to as a "pretenter coating". This curable pretenter primer coating comprises a polyurethane-based dispersion and a cross-linker, such as are described in detail above.

In some embodiments, the primer composition is coated onto both the first and second polyester surfaces of the substrate to form first and second cured primer layers. Coating both surfaces not only provides an article with both surfaces that are suitable for receiving additional coatings, but also provides an article in which both sides are the same. Having film articles where both sides are the same eliminates the need to take care in processing to remember which side has the primer coating. Additionally, the primer coatings of this disclosure, besides providing a modified surface suitable for receiving additional coatings, have been found to provide increased film handling ability. This increased film handling ability includes, for example, enhanced slipping over rollers and easier winding and unwinding of film rolls. This enhanced slippage can be attained or enhanced in some embodiments by including various polymeric or inorganic additives in the primer compositions. These additives include, for example, slip additives such as the water-based dispersion of fumed silica commercially available from Degussa Corporation (Parsippany, N.J.) as "AERODISP W 1226".

The curable primer coating may be coated onto one or both of the polyester surfaces of the substrate using any suitable coating or applying method or combination of methods useful for coating waterborne or solventborne mixtures. Examples of suitable coating equipment include knife coaters, roll coaters, reverse roll coaters, notched bar coaters, curtain coaters, roto-gravure coaters, rotary printers and the like. The viscosity of the aqueous or solvent mixture can be adjusted to the type of coater used. After the coatings are applied, they may be dried by any suitable drying process. Examples of suitable drying processes include air drying and the application of heat to dry such as with an IR lamp or oven such as a forced air oven.

After the primer layer or primer layers are dried on the substrate, the coated substrate can then be tentered or stretched in one or two dimensions in order to orient the film. The process of orienting film, particularly polyester films, is described in Volume 12 of The Encyclopedia of Polymer Science and Engineering, 2nd edition, pages 193 to 216. A typical process for fabricating biaxially oriented polyester films comprises four main steps: (1) melt extrusion of the polyester resin and quenching it to form a web, (2) drawing the web in the longitudinal or machine direction, (3) subsequently or simultaneously drawing the web in the transverse direction to create a film, and (4) heat setting the film. If biaxial orientation is desired, the primer composition may be coated on the multi-layer optical film after it has been drawn in the machine direction but before it has been subsequently drawn in the transverse direction. Further discussion on the orientation of polymeric films can be found, for example in the PCT Publication WO 2006/130142. Multi-layer optical films are typically produced in processes utilizing draw ratios in the range of 6:1 or greater, significantly higher than the 3.5:1-4:1 typically used in preparation of monolithic PET film. Unlike many primers used in the art, the primers of this disclosure have been found to yield coatings with excellent clarity, cosmetics, and adhesion properties even after draw at 6:1.

After the primed film article has been stretched and oriented, a variety of different layers can be contacted to the primer surface. Among these layers are optically clear heat activated adhesive layers, hardcoat layers, optical layers, and pressure sensitive adhesive layers. All of these layers have been described in detail above and can be applied using conventional coating or laminating techniques.

EXAMPLES

Advantages and embodiments of this disclosure are further illustrated by the following examples, but the particular materials and amounts thereof recited in these examples, as well as other conditions and details, should not be construed to unduly limit this disclosure. In these examples, all percentages, proportions and ratios are by weight unless otherwise indicated.

These abbreviations are used in the following examples: g=gram; min=minute; mol=mole; hr=hour; mL=milliliter; nm=nanometers; wt=weight; fpm=feet per minute; psi=pounds per square inch; kPa=kilo Pascals; PSA=pressure sensitive adhesive. If not otherwise indicated chemicals are available from Sigma-Aldrich, St. Louis, Mo.

| Table of Materials | |
|---|---|
| Material Designation | Description |
| PVB | Polyvinylbutyral type AR-11 PVB (0.015") commercially available from Solutia (St. Louis, MO). |
| HAA-1 | Optically clear heat activated adhesive, 35 mil (890 micrometers) thick, commercially available from DuPont Chemicals, Wilmington, DE, as "SentryGlasPlus". |

Table of Materials

| Material Designation | Description |
| --- | --- |
| HAA-2 | Optically clear heat activated adhesive, 15 mil (380 micrometers) thick commercially available from Bridgestone Corp, Tokyo, JP, as "EVASAFE". |
| AIC-1 | Aliphatic isocyanate crosslinker commercially available from Bayer Material Science LLC (Pittsburgh, PA) as BAYHYDUR 303 |
| AIC-2 | Aliphatic isocyanate crosslinker commercially available from Bayer Material Science LLC (Pittsburgh, PA) as BAYHYDUR 305 |
| AIC-3 | Aliphatic isocyanate crosslinker commercially available from Bayer Material Science LLC (Pittsburgh, PA) as BAYHYDUR 401-70 |
| AIC-4 | Aliphatic isocyanate crosslinker commercially available from Bayer Material Science LLC (Pittsburgh, PA) as BAYHYDUR XP2487/1 |
| AIC-5 | Aliphatic isocyanate crosslinker commercially available from Bayer Material Science LLC (Pittsburgh, PA) as BAYHYDUR XP7165 |
| AIC-6 | A self emulsifiable aliphatic polyisocyanate crosslinker commercially available from Perstorp Polyols, Inc. (Toledo, OH) as ESAQUA XD 401. |
| AIC-7 | A water dispersible aliphatic polyisocyanate crosslinker commercially available from Perstorp Polyols, Inc. (Toledo, OH) as ESAQUA XM 501. |
| ARC-1 | An amino-resin crosslinker commercially available from Cytec Industries Inc. (Woodland Park, NJ) as CYMEL 327. |
| BI-1 | Blocked isocyanate commercially available from Bayer Material Science LLC (Pittsburgh, PA) as BAYHYDUR VPLS 2310 |
| BI-2 | Blocked isocyanate commercially available from Bayer Material Science LLC (Pittsburgh, PA) as BAYHYDUR BL 5335. |
| BI-3 | Blocked isocyanate commercially available from Baxenden Chemicals Limited (Lancashire, England) as TRIXENE Bl 7986 |
| BI-4 | Blocked isocyanate commercially available from Baxenden Chemicals Limited (Lancashire, England) as TRIXENE Bl 7987. |
| PUD-1 | A solvent free 31% aqueous aliphatic polyester polyurethane dispersion commercially available from Alberdingk Boley, Inc. (Greensboro, NC) as U 9380. |
| PUD-2 | A solvent free 35% aliphatic polyester-polycarbonate polyurethane dispersion commercially available from Alberdingk Boley, Inc. (Greensboro, NC) as U 9150. |
| PUD-3 | A solvent-free 25% aqueous aliphatic polyurethane dispersion prepared as described below under "Synthesis of Polyurethane Dispersion 3". |
| Polyol-1 | Polyol commercially available from Bayer Material Science LLC (Pittsburgh, PA) as ARCOL POLYOL PPG 2000. |
| Polyol-2 | Polyol commercially available from Bayer Material Science LLC (Pittsburgh, PA) as ARCOL POLYOL PPG 1025. |
| H12MDI | The diisocyanate, bis(4-isocyanatocyclohexyl) methane commercially available from Bayer Material Science LLC (Pittsburgh, PA) as an 80% solids solution in 2-butanone solvent. |
| PU-1 | A hydroxyl functional polyurethane commercially available from Bayer Material Science LLC (Pittsburgh, PA) as BAYHYROL B 130. |
| Surfactant | A proprietary surfactant/wetting agent commercially available from International Specialty Products (Wayne, NJ) as EASY WET 20. |
| Slip Agent | A 26% solids water-based dispersion of fumed silica commercially available from Degussa Corporation (Parsippany, NJ) as AERODISP W 1226. |
| AEAPTMS | 3-(2-aminoethylamino)propyltrimethoxy silane was used as received from Alfa Aesar, Ward Hill, MA. |
| PAA | Poly(allylamine) hydrochloride was used as received from Alfa Aesar, Ward Hill, MA. |
| Coating Solution A | A 25% solids solution in toluene of an acid containing PSA A, with the monomers 2-EHA:BA:AA in the ratio 48:47:5. |
| Coating Solution B | A 20% solids solution in toluene of an acid free PSA B, with the monomers IOA:AM in the ratio 94:6. |
| 2-EHA | 2-ethylhexyl acrylate |
| BA | Butyl acrylate |
| AA | Acrylic acid |
| IOA | Isooctyl acrylate |
| AM | Acrylamide |

Synthesis of Polyurethane Dispersion 3

Based on a pound/100 pound charge, an isocyanate terminated prepolymer was prepared as follows. A mixture of Polyol-1 (0.003 eq), Polyol-1 (0.020 eq), and dimethylolpropionic acid (0.024 eq, obtained from GEO Specialty Chemicals) in 2-butanone (70% solids) with dibutyltin dilaurate catalyst (0.1 wt %, obtained from Air Products Chemicals Inc), was gradually treated with an 80% solution of H12MDI (0.069 eq). The mixture was stirred at 102° C. (215° F.) for 3-4 hr. The formed prepolymer solution was cooled to 79° C. (175° F.) and then gradually added to a dilute aqueous solution of triethyl amine (0.009 eq, obtained from Air Products and Chemicals Inc.) and ethylene diamine (0.017 eq, obtained from Dow Chemical Company). The mixture was stirred for 1 hr with high agitation, and then stripped under reduced pressure to yield a 25% solids aqueous polyurethane dispersion.

General Procedure for Coating Solution Preparation

Unless otherwise noted, all laboratory scale coating solutions were made in 100 g quantities. A vessel containing the primary polyurethane binder was stirred, followed by gradual addition of the specific neat crosslinker solution. Pre-mixed solutions of the crosslinkers were made at 20% solids for larger scale experiments using more than about a gallon of coating solution. The amount of isocyanate crosslinker solids used in each case was 20% by wt of the total binder solids, i.e. a 4:1 mixture of polyurethane to crosslinker. After stirring the binder and crosslinker 15 min, deionized water was used to dilute the material to a final concentration of 15% solids, and then Surfactant (0.08% of total solution wt) and Slip Agent (if used) were successively added. The solutions were stirred for another 15 min prior to use for coating operations. Alternate orders of addition, such as charging the binder and crosslinker to a stirred solution of deionized water and surfactant were determined to perform equivalently.

Coating and Tentering Procedures

Laboratory film samples were coated using a #6 Mayer coating rod purchased from RD Specialties, Inc. (Webster, N.Y.). The coated film was dried in a 165° F. (74° C.) oven for 3-5 min, and then the opposite side of the film was coated and dried similarly. The film was subsequently stretched in a "KARO IV LABORATORY STRETCHING MACHINE" commercially available from Bruckner, Siegsdorf, Germany using the following procedure: (i) Pre-heat for 25 s at 97° C. (ii) Simultaneously stretch in the machine direction (MD) 3.33 times and in the cross-web (TD) direction 3.46 times at 14%/s (iii) Heat the film for 60 s at 193° C. (iv) Stretch the film to 3.43 times in the MD and 3.56 times in the TD at 50%/s. For trials on manufacturing scale equipment, the coatings were applied using a reverse gravure roll coating process. The gravure roll speed was set at 125% draw and a finish speed of 45.75 fpm. The doctor blade pressure was set at 40 psi. After coating, the films were processed sequentially through a drying oven (130° F.), pre-heat and stretch zones (200-202° F.), heat set zone (422° F.), and lastly a cooling zone (100° F.). The stretching parameters were nominally the same as those described for the laboratory samples. The thickness of the dried coating was nominally 80-150 nm.

Multi-Layer Optical Film with PET Skins

Cast multi-layer optical film (MOF) was coated and then stretched before use in the articles and laminates described here. After the stretching and heat-set steps, the film is analogous to CM 875, a 2 mil (51 micrometer) nominal quarter wave IR reflecting film comprising 224 alternating layers of polyethylene terephthalte (PET) and coPMMA (poly methylmethacrylate), along with skin layers of the same PET on the exterior of the multi-layer stack. The film is described in U.S. Pat. No. 6,797,396 (Example 5).

Preparation and Testing of Glass Laminates

Glass laminates were 12 in×12 in. The construction of the laminates was as follows: 2.1 mm glass/15 mil PVB/Experimental Film/15 mil PVB/2.1 mm glass. The laminates were run through a nip roller to push out residual air, and then run through an autoclave that was ramped to 285° F./175 psi over 30 min, held for 30 min, and gradually cooled down over 30-60 min.

Compressive shear testing was done using 1.00 in +/−0.02 in square samples that were cut from the 12"×12" glass laminates prepared as above. The square samples were loaded into a test fixture of a MTS Alliance RT/50 machine equipped with a 11,000 lb-f (50,000 N) load cell to apply a 45 degree compressive shear force. The load cell was moved at a rate of 0.1"/min. The force at which the glass laminate failed was recorded and the average value is reported as determined from 6-10 repeat measurements.

Haze and percent transmission measurements were made using a BYK Gardner Plus AT-4725 instrument. Data is tabulated for both film samples and glass laminates.

Comparative Example C1

A film was made as described under "Multi-layer Optical Film with PET skins". The film was not coated with primer, but was tentered as described above in "Coating and Tentering Procedures" and made into a Glass/PVB/Film/PVB/Glass construction and tested as described under "Preparation and Testing of Glass Laminates". The results are presented in Table 1.

Comparative Example C2

A PAA coating solution was prepared as in U.S. Pat. No. 5,411,845, coated onto CM875 film as described above, tentered as described above, and made into a Glass/PVB/Film/PVB/Glass construction and tested as described under "Preparation and Testing of Glass Laminates". The results are presented in Table 1.

Comparative Example C3

A 1% AEAPTMS coating solution was prepared as in U.S. Pat. No. 5,064,722. A Glass/PVB/Film/PVB/Glass construction was made identically to Comparative Example C1, but the film was first coated on both sides of the multi-layer optical film with AEAPTMS as described under "Preparation and Testing of Glass Laminates". The results are presented in Table 1.

Comparative Example C4

A Glass/PVB/PVB/Glass construction was made and tested as in Comparative Example C1 but without the multi-layer optical film with PET skins. The results are presented in Table 1.

Example 1

A coating solution was prepared as described under "General Procedure for Solution Preparation" using PUD-1 as the primary binder and AIC-2 as the crosslinker. A film was made and processed as described under "Multi-layer Optical Film with PET skins" and "Coating and Tentering Procedures". The resultant processed film was made into a Glass/PVB/Film/PVB/Glass construction and tested as described under "Preparation and Testing of Glass Laminates". The results are presented in Table 1.

Example 2

A coating solution, film, and laminate were made and tested as described above for Example 1, except that Slip Agent was added so that the level of slip particles was 2.5% by weight of the dried coating. The results are presented in Table 1.

Example 3

A coating solution, film, and laminate were made and tested as described above for Example 1, except PUD-3 was used as the primary binder. The results are presented in Table 1.

Example 4

A coating solution, film, and laminate were made and tested as described above for Example 3, except that Slip Agent was added so that the level of slip particles was 2.5% by weight of the dried coating. The results are presented in Table 1.

Example 5

A coating solution, film, and laminate were made and tested as described above for Example 1, except PUD-2 was used as the primary binder. The results are presented in Table 1.

Example 6

A coating solution, film, and laminate were made and tested as described above for Example 1, except PU-1 and ARC-1 were used as the primary binder and crosslinker, respectively. The results are presented in Table 1.

Example 7

A coating solution, film, and laminate were made and tested as described above for Example 1, except PU-1 and AIC-2 were used as the primary binder and crosslinker, respectively. The results are presented in Table 1.

Example 8

A coating solution, film, and laminate were made and tested as described above for Example 1, except PUD-3 and ARC-1 were used as the primary binder and crosslinker, respectively. The results are presented in Table 1.

Example 9

A coating solution, film, and laminate were made and tested as described above for Example 1, except PUD-3 and AIC-2 were used as the primary binder and crosslinker, respectively. The results are presented in Table 1.

TABLE 1

| Example | Compressive Shear Strength (N/in$^2$) | Optics (film) | | Optics (laminate) | |
|---|---|---|---|---|---|
| | | % Haze | % Transmission | % Haze | % Transmission |
| C1 | 2,777 | NM* | NM | 0.7 | 85 |
| C2 | 5,988 | 15 | 88 | 1.9 | 83 |
| C3 | 3,881 | 17 | 89 | 1.1 | 86 |
| C4 | 7,375 | NM | NM | NM | NM |
| EX1 | 8750 | 3.0 | 92 | 0.9 | 88 |
| EX2 | 7485 | 3.9 | 95 | 0.7 | 89 |
| EX3 | 7820 | 3.0 | 92 | 1.0 | 86 |
| EX4 | 8994 | 4.2 | 96 | 0.7 | 89 |
| EX5 | 8,087 | 3.28 | NM | 0.44 | NM |
| EX6 | 5,259 | 3.12 | NM | 0.49 | NM |
| EX7 | 3,791 | 1.29 | NM | 0.54 | NM |

TABLE 1-continued

| Example | Compressive Shear Strength (N/in$^2$) | Optics (film) | | Optics (laminate) | |
|---|---|---|---|---|---|
| | | % Haze | % Transmission | % Haze | % Transmission |
| EX8 | 7,787 | 1.15 | NM | 0.47 | NM |
| EX9 | 7,936 | 0.62 | NM | 0.46 | NM |

*NM = not measured

Examples 10-16

Coating solutions, coated and processed film, and laminate constructions were made and tested as described above for Example 1 using PUD-1 as the primary binder and a variety of different crosslinkers. For Example 10 the crosslinker was AIC-6; for Example 11 the crosslinker was AIC-7; for Example 12 the crosslinker was AIC-1; for Example 13 the crosslinker was AIC-2; for Example 14 the crosslinker was AIC-3; for Example 15 the crosslinker was AIC-4; for Example 16 the crosslinker was AIC-5. The results are presented in Table 2.

TABLE 2

| Example | Compressive Shear Strength (N/in$^2$) | Optics (film) | | Optics (laminate) | |
|---|---|---|---|---|---|
| | | % Haze | % Transmission | % Haze | % Transmission |
| EX10 | 7,127 | 2.1 | 90.5 | 0.8 | 86.8 |
| EX11 | 7,572 | 6.4 | 91.0 | 1.0 | 87.0 |
| EX12 | 7,519 | 1.5 | 92.5 | 0.7 | 87.5 |
| EX13 | 6,828 | 3.0 | 92.0 | 1.0 | 86.0 |
| EX14 | 7,914 | 2.1 | 90.5 | 0.8 | 86.8 |
| EX15 | 6,184 | 8.0 | 91.0 | 1.6 | 87.5 |
| EX16 | 7,285 | 2.1 | 91.5 | 0.8 | 86.0 |

Examples 17-23

Coating solutions, coated and processed film, and laminate constructions were made and tested as described above for Example 1 using PUD-3 as the primary binder and a variety of different crosslinkers. For Example 17 the crosslinker was AIC-6; for Example 18 the crosslinker was AIC-7; for Example 19 the crosslinker was AIC-1; for Example 20 the crosslinker was AIC-2; for Example 21 the crosslinker was AIC-3; for Example 22 the crosslinker was AIC-4; for Example 23 the crosslinker was AIC-5. The results are presented in Table 3.

TABLE 3

| Example | Compressive Shear Strength (N/in$^2$) | Optics (film) | | Optics (laminate) | |
|---|---|---|---|---|---|
| | | % Haze | % Transmission | % Haze | % Transmission |
| EX17 | 7,109 | 0.9 | 80.0 | 0.7 | 85.0 |
| EX18 | 7,797 | 0.9 | 80.0 | 0.7 | 85.0 |
| EX19 | 2,509 | 2.1 | 92.0 | 0.7 | 88.0 |
| EX20 | 7,649 | 3.0 | 92.0 | 1.0 | 86.0 |
| EX21 | 4,875 | 3.0 | 93.0 | 0.9 | 87.0 |
| EX22 | 6,911 | 1.5 | 92.5 | 0.7 | 87.5 |
| EX23 | 8,665 | 2.1 | 90.5 | 0.8 | 86.8 |

Examples 24-27

Coating solutions, coated and processed film, and laminate constructions were made and tested as described above for Example 1 using PUD-1 as the primary binder and a variety of different crosslinkers. For Example 24 the crosslinker was BI-1; for Example 25 the crosslinker was BI-2; for Example 26 the crosslinker was BI-3; for Example 27 the crosslinker was BI-4. The results are presented in Table 4.

Example 28-30

Coating solutions, coated and processed film, and laminate constructions were made and tested as described above for Example 1 using PUD-3 as the primary binder and a variety of different crosslinkers. For Example 28 the crosslinker was BI-2; for Example 29 the crosslinker was BI-3; for Example 30 the crosslinker was BI-4. The results are presented in Table 4.

TABLE 4

| Example | Compressive Shear Strength (N/in$^2$) | Optics (film) | | Optics (laminate) | |
| --- | --- | --- | --- | --- | --- |
| | | % Haze | % Transmission | % Haze | % Transmission |
| EX24 | 7,157 | 2.5 | 90 | 0.9 | 84 |
| EX25 | 8,359 | 1.8 | 90 | 0.9 | 85 |
| EX26 | 8,201 | 2.5 | 89 | 1.0 | 78 |
| EX27 | 7,749 | 2.9 | 90 | 0.8 | 78 |
| EX28 | 8,445 | 2.5 | 92 | 1.0 | 87 |
| EX29 | 8,932 | 3.2 | 93 | 1.0 | 87 |
| EX30 | 8,744 | 4.2 | 92 | 1.0 | 86 |

Examples 31-33 and Comparative Examples C5 and C6

Glass laminates were made using optically clear heat activated adhesives in conjunction with two side polyurethane-base primed film and non-primed bare film. The film, both with and without primer, was made as described under "Multi-layer Optical Film with PET skins". The two primed films were as described in Examples 2 and 4. The non-primed film was as described in Comparative Example 1. The glass laminates were made with two optically clear heat activated adhesives HAA-1 and HAA-2. The finished laminate constructions were 2.1 mm glass/optically clear heat activated adhesive/film/optically clear heat activated adhesive/2.1 mm glass.

The glass laminates were made by the following method. Laminates were first de-aired in a vacuum bag. The vacuum bagged laminates were then placed in an autoclave and ramped to 135° C. (275° F.)/1207 kPa (175 psi) and held for 60 min after which they were gradually cooled down before removal from the autoclave. Examples 31 and 32 were done using the films of Example 1 and 2 respectively but with HAA-1 replacing PVB. Example 33 was done with the film of Example 2 but with HAA-2 replacing PVB. Comparative Examples C5 and C6 were done with the film of Comparative Example C1 but with HAA-1 and HAA-2 respectively replacing PVB. Testing was carried out as described in "Preparation and Testing of Glass Laminates". The results are presented in Table 5.

TABLE 5

| Example | Compressive Shear Strength (N/in$^2$) | Optics (laminate) | |
| --- | --- | --- | --- |
| | | % Haze | % Transmission |
| C5 | 13835 | 0.62 | 88 |
| C6 | 15843 | 0.69 | 88 |
| EX31 | 23128 | 0.62 | 88 |
| EX32 | 22995 | 0.68 | 88 |
| EX33 | 16453 | 0.78 | 88 |

Examples 34-41 and Comparative Examples C7-C10

Solvent based acrylic polymer PSA adhesive coating solutions were notch bar coated directly on to primed PET substrates and convection oven dried at a dry coating thickness of 6.35 micrometers (0.25 mil+/−0.1 mil). Two coating solutions were used, Coating Solution A and Coating Solution B. The primed substrates were Primed Substrate C which was the substrate as described in Example 1, Primed Substrate D which was substrate as described in Example 2, and Primed Substrate E which was sulfopolyester primed PET (as described in U.S. Pat. No. 5,439,785). The PSA coated primed PET substrates were applied to prewashed/precleaned borosilicate glass by both dry and wet application techniques. Samples were peeled from the glass at an approximate 90° angle immediately after application as well as after heat aging in a convection oven at 66° C. (150° F.) for 24 hr, 72 hr, and 1 week. Peel rates were in excess of 90 in/min (229 cm/min). Following peel testing, the amount of adhesive transfer to the glass substrate was evaluated. The results are presented in Table 6.

TABLE 6

| Example | Primed substrate/PSA | Application method | Immediate peel: PSA transfer to glass | 24 hr peel: PSA transfer to glass | 72 hr peel: PSA transfer to glass | 1 week peel: PSA transfer to glass |
| --- | --- | --- | --- | --- | --- | --- |
| EX34 | Substrate C/PSA A | Dry | None | None | None | None |
| EX 35 | Substrate C/PSA B | Dry | None | None | None | None |
| EX 36 | Substrate D/PSA A | Dry | None | None | None | None |
| EX 37 | Substrate D/PSA B | Dry | None | None | None | None |
| C7 | Substrate E/PSA A | Dry | ~25% | ~5-10% | ~5-10% | ~5-10% |
| C8 | Substrate E/PSA B | Dry | ~5-10% | 25-50% | 25-50% | 25-50% |

TABLE 6-continued

| Example | Primed substrate/PSA | Application method | Immediate peel: PSA transfer to glass | 24 hr peel: PSA transfer to glass | 72 hr peel: PSA transfer to glass | 1 week peel: PSA transfer to glass |
|---|---|---|---|---|---|---|
| EX 38 | Substrate C/PSA A | Wet | 25-50% | None | None | None |
| EX 39 | Substrate C/PSA B | Wet | 25-50% | None | None | None |
| EX 40 | Substrate D/PSA A | Wet | 25-50% | None | None | None |
| EX 41 | Substrate D/PSA B | Wet | 25-50% | None | None | None |
| C9 | Substrate E/PSA A | Wet | 25-50% | ~5-10% | ~5-10% | ~5-10% |
| C10 | Substrate E/PSA B | Wet | 25-50% | 25-50% | 25-50% | 25-50% |

What is claimed is:

1. A laminate construction comprising:
a first glazing substrate comprising a first major surface and a second major surface;
a film article adhered to the first major surface of the first glazing substrate, the film article comprising
a substrate with a first polyester surface and a second polyester surface;
a first crosslinked polyurethane-based primer coated on the first polyester surface, and a
second crosslinked polyurethane-based primer coated on the second polyester surface; and
a first optically clear heat activated adhesive adjacent to the first crosslinked polyurethane-based primer and a layer adjacent to the second crosslinked polyurethane-based primer, wherein the layer adjacent to the second crosslinked polyurethane-based primer comprises a second optically clear heat activated adhesive, and further comprising a second glazing substrate comprising a first major surface and a second major surface with the first major surface of the second glazing substrate being adhered to the second optically clear heat activated adhesive, such that the laminate construction comprises a sandwich construction comprising the first glazing substrate, an interlayer article, and the second glazing substrate, wherein the interlayer article comprises the film article and the second optically clear heat activated adhesive.

2. The laminate construction of claim 1, wherein the first and second crosslinked polyurethane-based primer comprises the reaction product of a polyurethane-based dispersion and a crosslinker.

3. The laminate construction of claim 1, wherein the first and second crosslinked polyurethane-based primer independently comprises a polyester-based polyurethane, a polycarbonate-based polyurethane primer, or a combination thereof.

4. The laminate construction of claim 1, wherein the first and second crosslinked polyurethane-based primer independently comprises an aliphatic polyurethane-based or aliphatic polyester-based polyurethane primer.

5. The laminate construction of claim 2, wherein the crosslinker comprises an aliphatic diisocyanate, a blocked isocyanate, melamine formaldehyde crosslinker, or a combination thereof.

6. The laminate construction of claim 1, wherein the substrate comprises a multi-layer substrate.

7. The laminate construction of claim 1, wherein the substrate comprises an oriented film.

8. The laminate construction of claim 1, wherein the first optically clear heat activated adhesive comprises a polyacrylate hot melt adhesive, a polyvinyl butyral, an ethylene vinyl acetate, an ionomer, a polyolefin, or a combination thereof.

9. The laminate construction of claim 1, wherein the first glazing substrate comprises glass or a polymeric material.

10. The laminate construction of claim 1, wherein the laminate construction has a luminous transmission of at least 90%, and a haze of less than 3% in the 400-700 nm wavelength range.

11. The laminate construction of claim 1, wherein the second glazing substrate is different from the first glazing substrate.

12. The laminate construction of claim 1, wherein the second glazing substrate is the same as the first glazing substrate.

13. The laminate construction of claim 1, wherein the second optically clear heat activated adhesive comprises a polyacrylate hot melt adhesive, a polyvinyl butyral, an ethylene vinyl acetate, an ionomer, a polyolefin, or a combination thereof.

14. The laminate construction of claim 1, wherein the second optically clear heat activated adhesive is the same as the first optically clear adhesive.

15. The laminate construction of claim 1, wherein the second optically clear heat activated adhesive is different from the first optically clear adhesive.

* * * * *